United States Patent Office 3,015,098
Patented Dec. 26, 1961

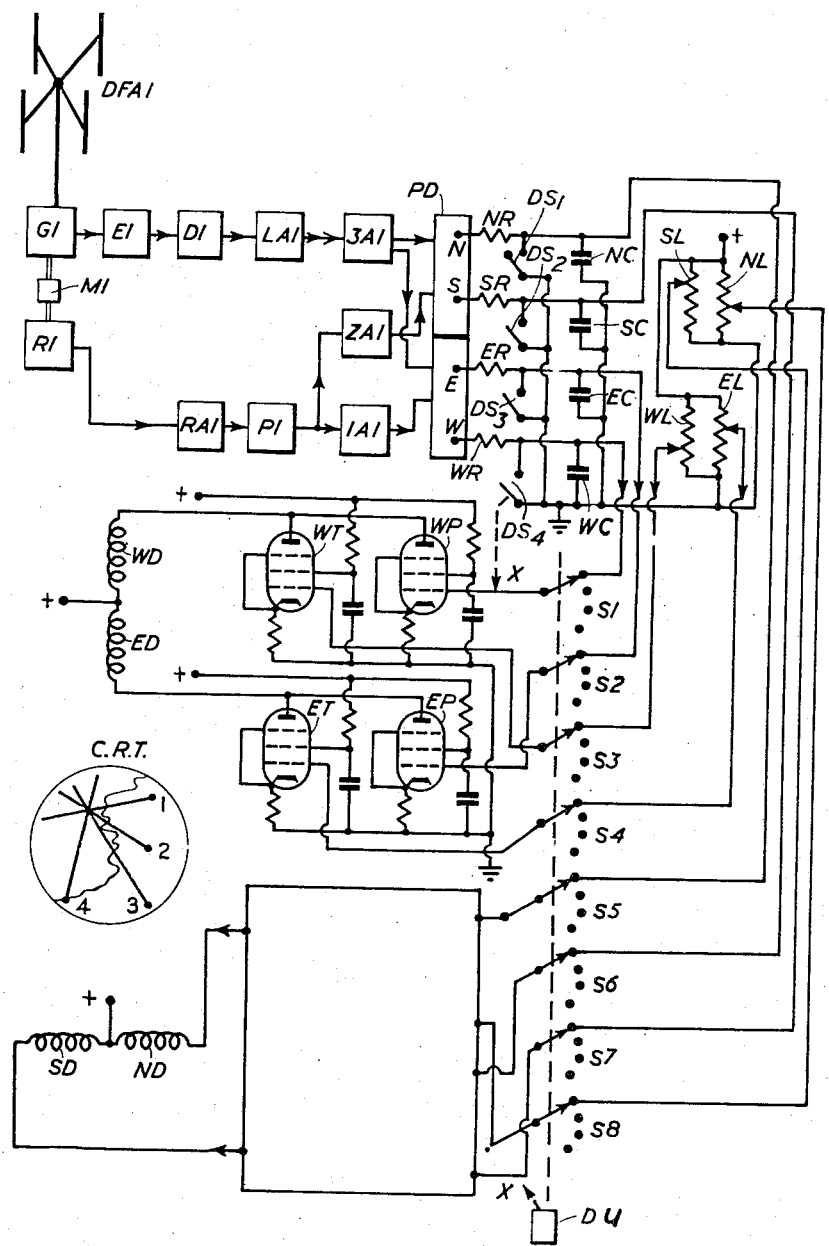

3,015,098
RADIO POSITION INDICATING SYSTEMS
Sidney Arthur Walter Jolliffe, Maldon, and David William Watson, Great Baddow, England, assignors to Marconi's Wireless Telegraph Company Limited, London, England, a British company
Filed Dec. 8, 1958, Ser. No. 778,725
Claims priority, application Great Britain Jan. 20, 1958
1 Claim. (Cl. 343—112)

This invention relates to radio position indicating systems of the kind in which the position of a radio transmitting station is ascertained by taking radio bearings thereof from geographically spaced radio direction finders in known positions and then "fixing" the position of the transmitting station (which may, for example, be an aircraft transmitter) by noting the point of intersection of the bearing lines on a chart.

It is obviously convenient in a radio position indicating system of this kind to arrange for a cathode ray display tube to display the radio bearing lines against a chart. This obviously avoids the need for plotting the bearing lines for the position of the transmitter is seen by direct observation of the point of intersection of the displayed lines. Known radio position indicating systems of this nature, however, have the defects of being complex and difficult to install and operate mainly because they involve the use of more or less special display tubes with complex ray deflection systems. So far as the present applicants are aware all previously known radio position indicating systems of this nature have involved the provision of at least two distinct cathode ray deflecting systems each capable of deflection in two mutually perpendicular directions, and in some cases the different ray deflecting systems have been of different kinds, i.e. one magnetic and another electrostatic. The complexities and the operating and maintenance difficulties involved in such known systems are serious, and the principal object of the present invention is to reduce or eliminate these complexities and difficulties.

According to this invention a radio position indicating system comprises at least two geographically spaced radio direction finders in predetermined different geographical positions and each adapted to produce periodic signals representative of mutually perpendicular components of the incoming signal direction of a signal received thereby; means for producing, for each radio direction finder, origin shift preset D.C. voltages (that is to say signals which do not vary with time) representative of the same mutually perpendicular components of the geographical position of that direction finder with respect to a datum geographical position; a cathode ray display tube having mutually perpendicular ray deflection means; means for cyclically and simultaneously selecting the component periodic signals produced by each direction finder in turn together with the component time constant signals appropriate to that direction finder; and means for utilising the corresponding selected periodic and origin shift preset D.C. voltages jointly to produce deflection in a cathode ray display tube in the corresponding one of two mutually perpendicular directions, the cyclic selection being effected at such speed and the whole arrangement being such that the display tube displays a substantially continuous picture composed of a plurality of intersecting lines each of which originates at a position corresponding to the geographical position of a different direction finder and extends in a direction corresponding to the incoming direction of the signal received thereby.

In a preferred embodiment each direction finder comprises a directional aerial system of continuously rotated directivity, a reference frequency source of the frequency of rotation and a phase discriminator system fed with signals from said aerial system and also with said reference frequency and adapted to produce D.C. outputs representative of the mutually perpendicular components of the incoming signal direction, and the aforesaid D.C. outputs are fed to condensers which are periodically discharged together so that the voltage waves across said condensers are periodic saw tooth signals representative of said mutually perpendicular components. Cyclic selection is preferably effected by a plurality of switches (which may be electronic) each having as many positions as there are radio direction finders. Preferably the North, East, South and West periodic signal components from each direction finder are separately derived and the North, East, South and West time constant signal components, representative of the geographical position of that direction finder, are also separately derived and the corresponding periodic and origin shift preset D.C. voltages (North in one case, East in another . . . and so on) are combined by a pair of valves in each case, one receiving the periodic component and the other the origin shift preset D.C. voltages. Each pair of valves—there are four pairs—has a common anode circuit which feeds one or other of the four terminals of the co-ordinate deflection system of a display cathode ray tube. Such a system might, for example, consist of North, East, South and West deflecting coils each in the anode circuit of one or other of the four pairs of valves.

Normally, in carrying out the invention the mutually perpendicular components of direction and position will be as above stated North-South and East-West components, though obviously this is not a theoretical necessity it being, theoretically, only necessary that the components shall be in predetermined mutually perpendicular directions. The display tube will, in practice, be arranged to produce its display against a background representation showing the direction finders in their correct positions and covering the service area of the whole system.

The invention is illustrated in the accompanying drawing which illustrates diagrammatically one embodiment of the invention so far as is necessary to an understanding thereof. In the drawing the various switches employed are, for the sake of simplicity, shown as mechanical switches, but, as will be apparent later, any or all of them could be replaced by electronic switches of any suitable kind known per se. Again, although the system illustrated by the drawing embodies four radio direction finders in geographically spaced positions, only one of them has been shown since the others are all similar.

Referring to the drawing, there are four radio direction finders (there might, of course, be any number, not less than two) of which only one is shown. This includes a directional aerial system of continuously rotated directivity and known per se. This aerial system is illustrated as comprising an Adcock aerial arrangement DFA1 and an associated radio goniometer which is represented by the block G1, and the search element of which is continuously rotated at a suitable speed (for example 1500 r.p.m.) by a motor M1. The motor M1 also drives a reference frequency generator R1 which produces a reference frequency of the same value as the modulation frequency set up in received signals by virtue of the rotation of the goniometer rotor. In the example now being given this frequency is 25 c./s. The search element of the goniometer G1 feeds into a receiver amplifier E1 which in turn feeds into a detector D1 followed by a frequency selective amplifier LA1 which is selective to the frequency of modulation produced by the rotation of the goniometer G1, e.g. selective to 25 c./s.

The output from LA1 is further amplified by an amplifier 3A1. Output from the reference frequency source R1 is amplified by an amplifier RA1, also selective to the frequency of 25 c./s. and fed to a known phase splitting circuit P1 which supplies two outputs in phase quadrature. These outputs are further amplified at 1A1 and 2A1 respectively.

The quadrature outputs from the amplifiers 1A1 and 2A1 and the signal output from the amplifier 3A1 are phase compared in any suitable known phase discriminator system PD which produces at the terminals N, S, E and W, D.C. outputs proportional (so far as the output from the terminals N, S are concerned) to the sine of the bearing angle of an incoming signal and (so far as the output from the terminals E, W are concerned) proportional to the cosine of the said bearing angle. In other words the signals at the terminals N, S are D.C. signals representative of the North-South components of direction of an incoming signal, and the D.C. potentials at the terminals E, W are similarly representative of the East-West components. The apparatus as so far described is all as well known per se and requires no further description here. Voltages at the terminals N, S, E and W are fed through resistances NR, SR, ER and WR respectively to charge condensers NC, SC, EC and WC respectively. These condensers are periodically discharged at a suitable frequency by switches $DS_1$ to $DS_4$ which are closed momentarily at a suitable frequency in any convenient known way. For simplicity in drawing the switches $DS_1$ to $DS_4$ are shown as mechanical switches mechanically closed together periodically by a drive represented by the chain line X (shown, for convenience, at its ends only) and provided by a drive unit DU which also operates other switches to be referred to later. It will be seen that with this arrangement there will be produced across the condensers NC, SC, EC and WC periodic saw tooth waves representative of the North-South and East-West components of the direction of an incoming signal received upon the aerial DFA1. These saw tooth waves are applied to the No. 1 contacts of four switches S5, S6, S2 and S1 which are ganged with four similar switches S3, S4, S7 and S8. Each of these switches has four contacts numbered 1, 2, 3 and 4 in each case. These switches are driven together by the drive unit represented at DU so that they move together to their contacts 1, 2, 3, 4, 1, 2 . . . etc. cyclically and in turn at a suitable frequency. The number 1 contacts of the switches S3, S4, S7 and S8 are connected as shown to the sliders WL, EL, SL, NL of four potentiometers fed from a suitable D.C. source as shown. It will be seen that the sliders can be independently adjusted to tap off different required voltages. The sliders are adjusted so that the voltages (which are constant with time) at the sliders NL and SL are representative of the North-South component of the position of the aerial DFA1 with respect to a datum position and similarly the sliders EL and WL are adjusted to produce voltages representative of the East-West components of that position.

The signal on the arm of the switch S1 (the West periodic signal component) and that on the arm of the switch S3 (the West origin shift voltage) are combined by a pair of valves WP and WT which have a common anode circuit feeding one coil WD of a bifilar pair of coils adapted to produce deflection of the ray in a cathode ray tube CRT in the West direction. The tube is conventionally represented by its screen. Similarly the East periodic and origin shift preset D.C. voltages are combined by a pair of valves EP and ET feeding the other (East) coil ED of the bifilar pair of coils.

Two more pairs of valves are fed in the same manner from the arms of the switches S5, S8 and S6, S7 and feed similarly into one or other of the coils of a bifilar pair ND, SD at right angles to the coils WD and ED. Thus, with the switches S1 to S8 on their number 1 contacts the deflection system of the tube will operate to produce a line originating from a point 1 whose position on the screen of the tube corresponds to the geographical position of the aerial DFA1 and whose direction corresponds to that of the signal coming in to the aerial DFA1.

The number 2 contacts of the switches are similarly connected to receive periodic and time-constant signals representative of the components of direction and position of a second direction finder (not shown) and similarly the number 3 contacts are appropriate to a third direction finder and the number 4 contacts are appropriate to a fourth direction finder. As the second, third and fourth sets of direction finding apparatus and connections are all the same as those illustrated for the first, they are not shown in the figure.

The drive unit DU for the switches $DS_1$ to $DS_4$ and S1 to S8 operates at such speed, having regard to the period of afterglow of the screen of the tube CRT, as to cause the four position lines produced by that tube to appear more or less continuously or at any rate with insufficient flicker to be troublesome. When the switches S1 to S8 are on their number 1 contacts, a bearing line originating at the geographical position of the number 1 direction finder appears; when the switches are on their number 2 contacts, a bearing line at the point marked 2 on the screen appear; when the switches are on their number 3 contacts, the radio bearing from the third direction finder is displayed in its correct position; and when the switches are in their fourth position, the radio bearing from the fourth direction finder is similarly displayed. By afterglow effect the bearing lines appear continuously and their point of intersection shows by direct inspection the position of the station being received. The tube is arranged to provide its bearing line display against a correct scale chart of the service area. This chart may be a semi-transparent chart on the end of the tube (as indicated in the figure) or the tube display may be optically superimposed on the chart. Thus position finding by direct inspection and without plotting is provided by an apparatus the display tube of which is a normal display tube with only a simple single mutually perpendicular coil deflecting system consisting of a pair of coils for each component of deflection.

We claim:

A radio position indicating system comprising at least two geographically spaced radio direction finders of continuously rotatable directivity in predetermined different geographical positions and each adapted to produce periodic signals representative of mutually perpendicular components of the incoming signal direction of a signal received thereby; a reference frequency source of the frequency of rotation and a phase discriminator system fed with signals from said direction finders and said reference frequency and adapted to produce origin shift preset D.C. voltages representative of the mutually perpendicular components of the incoming signal direction; a plurality of condensers, said D.C. voltages being fed to said condensers, said condensers being periodically discharged together so that the voltage waves across said condensers are periodic saw tooth signals representative of said mutually perpendicular components of the geographical position of that direction finder with respect to a datum geographical position; a cathode ray display tube having mutually perpendicular ray deflection means; cyclically and simultaneously selecting, by switches having as many positions as there are direction finders, the component periodic signals produced by each direction finder in turn with the origin shift preset D.C. voltages appropriate to that direction finder; and means for utilizing the corresponding selected periodic and time constant component signals jointly to produce balanced deflection in a cathode ray display tube in the corresponding one of two mutually perpendicular directions, whereby the display tube displays a substantially continuous picture composed of a plurality of intersecting lines each of which originates at a position corresponding to the geographical position of a different direction finder and extends in a direction corresponding to the incoming direction of the signal received thereby.

References Cited in the file of this patent

UNITED STATES PATENTS

| | | |
|---|---|---|
| 2,400,232 | Hall | May 14, 1946 |
| 2,490,306 | Jones | Dec. 6, 1949 |
| 2,512,615 | Earp et al. | June 27, 1950 |
| 2,858,475 | Blake | Oct. 28, 1958 |
| 2,880,412 | Matthews | Mar. 31, 1959 |